United States Patent [19]

Hamilton

[11] 4,401,732
[45] Aug. 30, 1983

[54] FLUID CATHODE DEPOLARIZED CELL

[75] Inventor: Noble E. Hamilton, Middleton, Mass.

[73] Assignee: Duracell Inc., Bethel, Conn.

[21] Appl. No.: 342,955

[22] Filed: Jan. 26, 1982

[51] Int. Cl.³ .............................................. H01M 4/36
[52] U.S. Cl. ..................................... 429/105; 429/196
[58] Field of Search ................ 429/101, 105, 194, 196

[56] References Cited

U.S. PATENT DOCUMENTS

| | | | | |
|---|---|---|---|---|
| 3,945,846 | 3/1976 | Dey | | 429/72 X |
| 4,028,138 | 6/1977 | Dey | | 429/72 X |
| 4,352,866 | 10/1982 | Klinedinst | | 429/196 X |
| 4,367,268 | 1/1983 | Behl | | 429/196 X |

*Primary Examiner*—Charles F. LeFevour
*Attorney, Agent, or Firm*—Ronald S. Cornell; Israel Nissenbaum

[57] ABSTRACT

A small diameter (<1" (2.54 cm)) fluid depolarized cell having enhanced electrochemical capability and being both economical and adaptable to high rate manufacturing procedures. The cell is made with a cathode slurry of the fluid depolarizer and controlled amounts of an activated carbonaceous material.

14 Claims, 1 Drawing Figure

U.S. Patent
Aug. 30, 1983
4,401,732
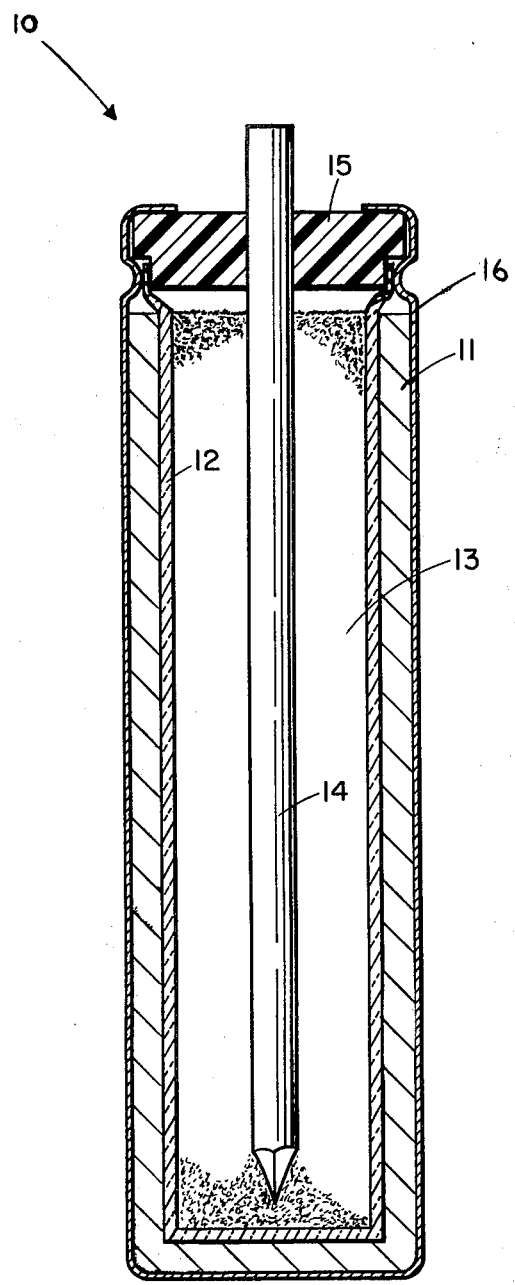

FLUID CATHODE DEPOLARIZED CELL

This invention relates to small diameter electrochemical cells containing fluid cathode depolarizers, particularly nonaqueous cells having fluid electrolyte/cathode depolarizers such as sulfur dioxide ($SO_2$) and thionyl chloride ($SOCl_2$).

In the past, nonaqueous electrochemical cells having fluid cathode depolarizers such as sulfur dioxide and thionyl chloride were constructed in generally one of two ways. The cathode, typically an activated carbon or carbonaceous material upon which the fluid cathode depolarizer was reduced during cell discharge, was generally comprised of such active carbon pasted upon an expanded metal substrate or such carbon compacted into and supported by the cell container or other supporting structure. In such constructions the fluid cathode depolarizers were placed into the cells after such cathode formation. In the configuration wherein the activated carbon was pasted upon an expanded metal substrate the cathode was wound into a convolute or "jelly roll" structure together with layers of the anode material and separating elements. Such configuration is typical of large cell construction (e.g., "D" size, 1.3" (3.3 cm) diameter) and provided cells with high capacity and excellent current carrying capabilities. In smaller cells such configuration presented difficulties in the manufacturing procedures because of the closer tolerances involved. Thus it was the procedure of manufacture such smaller cells, for example, as described in U.S. Pat. Nos. 3,945,846 and 4,028,138, with a solid cored out carbon or active cathode supported by the cell container and into which cored out section the remaining cell components and the fluid cathode depolarizer were placed. However, because of the solid nature of the cathode such cell had reduced active cathode surface area and provided reduced current carrying capability.

It is an object of the present invention to provide small diameter cells wherein electrochemical capability is enhanced and manufacturing procedure is simplified.

This and other objects, features and advantages of the present invention will become more evident from the following discussion as well as the drawing in which the sole FIGURE is a schematic sectioned elevation view of a cell made in accordance with the present invention.

Generally, the present invention comprises cylindrical fluid depolarized cells having small inner diameters of less than about one inch (2.5 cm) and preferably less than 0.5" (1.2 cm) and generally with diameters of about 0.3 inches (0.76 cm). The cell is preferably constructed by initially lining the cell container with the metallic anode material preferably in the form of a foil. The anode is thereafter internally covered with a separating element with a central void remaining in the container. The void space is then filled such as by injection with an intimate slurry mix of the fluid cathode depolarizer and an activated carbonaceous powder. A metallic current collector such as a nail or pin is embedded longitudinally within said slurry (prior to, during or after the cell sealing) to complete the cell. Alternatively, the cathode slurry may be initially placed adjacent the cell container wall and the anode metal placed in the center. It has been discovered that the use of a cathode slurry is efficacious in producing cells with improved electrochemical capability but only in cells with small diameters of less than about 1" (2.5 cm) and preferably on the order of about 0.3" (0.74 cm). In larger size cells such as the "D" size cell constructed with a cathode paste as described in Example 18 of Great Britain Patent Specification No. 1,409,307 the capacity of such cells becomes unacceptably low (about 30% of theoretical capacity of about 10 Ahrs for the cell size described) even at the relatively low (for its size) discharge rate (50 ma) at which the cell is tested. In contrast thereto cells with diameters of about 0.3" (0.76 cm) made in accordance with the present invention have provided capacities of two to three times as much at similar or even higher discharge rates.

A further important criterion in the practice of the present invention is the percentage of activated carbon in the slurry with the fluid cathode depolarizer with which it is mixed. This percentage is further dependent upon the density of the particular carbon being utilized. Thus for the most preferred carbon, Shawinigan acetylene black (50% compressed) which has the lowest apparent density of commonly available carbons, the weight percentage range is between 2 to 9% (1.7–7.8 volume %) with a preferred weight percentage of about 4–5% (3.5 to 4.4 volume %). Deviations from such carbon percentages provide cells having unacceptably low or no capacity at all. Other types of activated carbon utilizable in the slurry mix of the present invention include those enumerated in *Primary Li/SOCl₂ Cells VIII. Effect of Type of Carbon on the Performance* by A. N. Dey, 126 J. Electrochem. Soc. 2052 (Dec. 1979). Such carbons include Elftex-12, Regal 660R, Vulcan XC-72R, Monarch 700, Sterling R and Conductex 950. Because of the varying densities of the aforementioned carbons their acceptable weight percentages vary in accordance with the present invention and are extrapolatable from the volume percentage range of 1.7–7.8%.

Thus, given a particular cell volume which is to accommodate the cathode a greater weight percentage of the denser carbons will be required to fill such volume. Additionally, the denser carbons have a lesser active surface area because of their density thus further requiring an increase in the weight percentage. By the same token less dense carbons will require lesser weight percentages to fill a given cathode volume. The percentage ranges given above are relative to the carbon and fluid cathode depolarizer and do not include the weights of additional materials such as binders notably polytetrafluoroethylene (PTFE) which may be further added to the slurry mixture.

The slurry cathode mix of the present invention is a well mixed combination of the active carbon cathode material and the fluid cathode depolarizer such as thionyl chloride. The thionyl chloride additionally serves as the electrolyte salt solvent and accordingly further contains the solvated electrolyte salt such as $LiAlCl_4$. Thus with a single dispensing such as by metered injection the cathode is constructed without the necessity of conventional cathode processing steps of rolling a carbon-solvent-binder mix into sheets, baking, cutting, winding, etc. Furthermore, the conventional requirement for a battery fill port, evacuation for filling and the actual filling with the fluid cathode depolarizer/electrolyte solvent and the sealing of said fill port may be dispensed with. Furthermore, particularly in the case of highly corrosive materials such as thionyl chloride which normally reacts with the moisture in the air, the necessity for completely closed systems is obviated. It has in fact been found that good cells can be made even in air though with some minimization of air contact.

Fluid cathode depolarizers which also function as electrolyte solvents or cosolvents include the aforementioned thionyl chloride, sulfur dioxide and other fluid oxyhalides, nonmetallic oxides, non-metallic halides and mixtures thereof such as phosphourous oxychloride ($POCl_3$), selenium oxychloride ($SeOCl_2$), sulfur trioxide ($SO_3$), vanadium oxytrichloride ($VO_2Cl_3$), chromyl chloride ($CrO_2Cl_2$), sulfuric oxychloride ($SO_2Cl_2$), nitryl chloride ($NO_2Cl$), nitrosyl chloride ($NOCl$), nitrogen dioxide ($NO_2$), sulfur monochloride ($S_2Cl_2$) and sulfur monobromide ($S_2Br_2$). Each of the above can be used together with thionyl chloride ($SOCl_2$) as electrolyte solvent/cathode depolarizer or separately. Additionally, the consumable fluid depolarizer/electrode solvents may be used in cells in conjunction with other nonaqueous solvents which include organic solvents such as propylene carbonate, acetonitrile, methyl formate, tetrahydrofuran and the like.

Metals utilizable for the anode include the alkali and alkaline earth metals and alloys with lithium being the most preferred metal. The electrolyte salts include the aforementioned $LiAlCl_4$ and other metal tetrachloroaluminates, fluoroborates, hexafluoroarsenates, halides, gallium halides, cloroborates etc. which are soluble in the fluid cathode depolarizer and which provide suitable ionic conductivities generally in excess of $1 \times 10^{-3} ohm^{-1} cm^{-1}$.

With reference to the drawing the FIGURE is that of a cell 10 having a metal can 16 with a lithium foil lining 11 as the cell anode. Cathode slurry 13 comprised of a well mixed mixture of thionyl chloride or other fluid cathode depolarizer with active carbon powder and optionally a binder material, fills the void in the center of the can 16 and is separated from the anode foil by separator bag 12 made of a material such as glass in the case of a thionyl chloride containing cell. The cell is sealed by crimping the edge of can 16 over a PTFE plug 15 and perforating said plug with stainless steel pin 14. Said pin 14 functions as the cathode current collector and cathode terminal. To enhance contact with the cathode slurry 13 metal wire mesh is welded around the pin (not shown). Similarly to enhance anode-container wall contact an expanded metal is welded to the interior wall of the container (not shown).

In order to fully illustrate the efficacy of the present invention when utilized in small diameter cells the following examples are presented. It is understood, however, that such examples are for illustrative purposes only and that any enumeration of detail therein is not to be construed as a limitation on the present invention.

EXAMPLES 1–8

Small diameter cells (0.3" (0.76 cm) O.D.—0.28" (0.71 cm) I.D.) were made with 1½" (3.8 cm) long cylindrical containers having expanded metal substrates resistance welded to the interior surfaces thereof. Lithium metal foil (each ¾" (1.9 cm) × 1¼" (3.2 cm) × 0.018" (0.045 cm)) was coiled, inserted and rolled against the expanded metal on the interior container surface of each cell. A bag separator of glass filter paper was then pushed into the center of the container against the lithium foil. Under ambient conditions each cell container was then injection filled with 1.7 grams of a slurry mixture of 1.8 M $LiAlCl_4$ in $SOCl_2$ and Shawinigan acetylene black (50% compressed).

A stainless steel pin (0.062 (0.16 cm) diameter × 1 9/16" (4 cm length) through a PTFE plug, as depicted in the drawings, was pressed into the open end of the container and the container crimped against the plug to seal the cell. Some cells had expanded metal welded to the pin.

The cells had varying weight percentages of the Shawinigan black therein and were each discharged at 10 mA (1.6 mA/cm$^2$) to a 2.5 volt cutoff. The theoretical capacity of each of the cell was about 500 mAhrs. Some of the cells additionally contained PTFE as a binder in the cathode.

The following table indicates the particular cell construction and capacities obtained:

TABLE

| Cell No. | Slurry Composition Wt. % Shawinigan Bl. | (vol. %) | Capacity to 2.5 Volts* MAhr | % Theoretical |
|---|---|---|---|---|
| 1 | 5.4% | (4.7%) | 270 | 54 |
| 2 | 4.4% | (3.8%) | 380 | 76 |
| 3 | 3.9% | (3.4%) | 300 | 60 |
| 4 | 2% | (1.7%) | 0 | 0 |
| 5 | 4.2% | (3.7%) | 384 | 77 |
| 6 | 4.2% + 0.46% PTFE | (3.6%) | 450 | 90 |
| 7 | 4.5% + 0.5% PTFE | (3.8%) | 436 | 87 |
| 8 | 8.4% | (7.3%) | 150 | 30 |

*Capacities represent average cell capacities

EXAMPLE 9

A cell was made as in Example 1 with with cell container dimensions 1.56" (4 cm) length and 0.418" (1.06 cm) I.D. The lithium lining the inside surface of the cell container was about 1.1" (2.8 cm) × 0.03" (0.08 cm) thick. The 1.8 M $LiAlCl_4$—$SOCl_2$ Shawinigan black slurry weighed 4 gms and was 4.4% (3.8 vol %) Shawinigan black. The cell had a theoretical capacity of 1.44 Ahrs.

The cell was discharged with a 75Ω load and provided about 1.05 Ahr to 2.5 volts (73% of theoretical) and 1.13 Ahr to 2 volts (78% of theoretical).

The preceding examples were presented for illustrative purposes with changes in cell structure, components and component ratio, being possible without departing from the scope of the present invention as defined in the following claims.

What is claimed is:

1. A small diameter cylindrical electrochemical cell having an anode comprised of an alkali or alkaline metal, a fluid cathode depolarizer/electrolyte solvent with electrolyte salt dissolved therein and an inert cathode made of a carbonaceous powder all contained within a cell container characterized in that the inner diameter of said cell container is less that about one inch (2.5 cm) and said fluid cathode depolarizer and said carbonaceous material are in admixture as a slurry within said cell wherein said carbonaceous powder comprises from 1.7 to 7.8% by volume of said slurry.

2. The cell of claim 1 wherein said carbonaceous powder is comprised of Shawinigan acetylene black.

3. The cell of claim 1 wherein said fluid cathode depolarizer is selected from the group consisting of fluid oxyhalides, non-metallic oxides, non-metallic halides and mixtures thereof.

4. The cell of claim 3 wherein said fluid cathode depolarizer is comprised of thionyl chloride.

5. The cell of claim 3 wherein said fluid cathode depolarizer is comprised of sulfur dioxide.

6. The cell of claim 1,4 or 5 wherein said anode is comprised of lithium.

7. The cell of claim 1 wherein said inner diameter is less than about 0.5 inches (1.2 cm).

8. The cell of claim 1 wherein said carbonaceous powder comprises between 3.5 to 4.4% by volume of said slurry.

9. The cell of claim 1 wherein said slurry further contains a binder.

10. The cell of claim 9 wherein said binder is comprised of polytetrafluoroethylene.

11. A small diameter cylindrical cell having a lithium anode, a slurry of thionyl chloride cathode depolarizer and a cathode comprised of a carbonaceous powder comprising from 3.5 to 4.4% by volume of said slurry.

12. The cell of claim 11 wherein said lithium anode comprises a foil which lines the inner surface of said container, and wherein said slurry is positioned within said foil lining and is spaced therefrom by separating means.

13. The cell of claim 11 wherein said carbonaceous powder is comprised of Shawinigan acetylene black.

14. The cell of claims 11, 12 or 13 wherein said slurry further contains a binder comprised of polytetrafluoroethylene.

* * * * *